Figure 3:
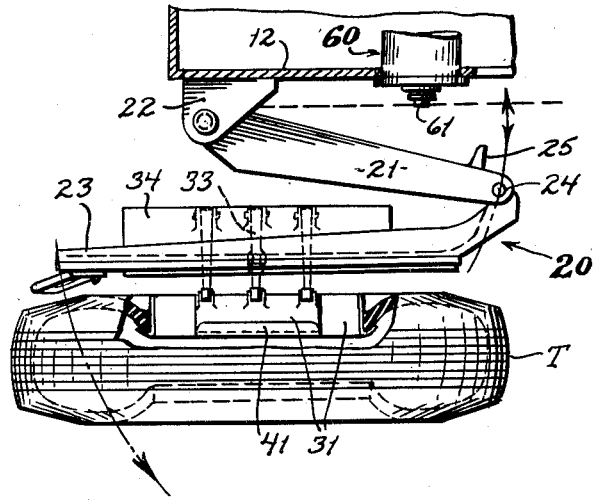

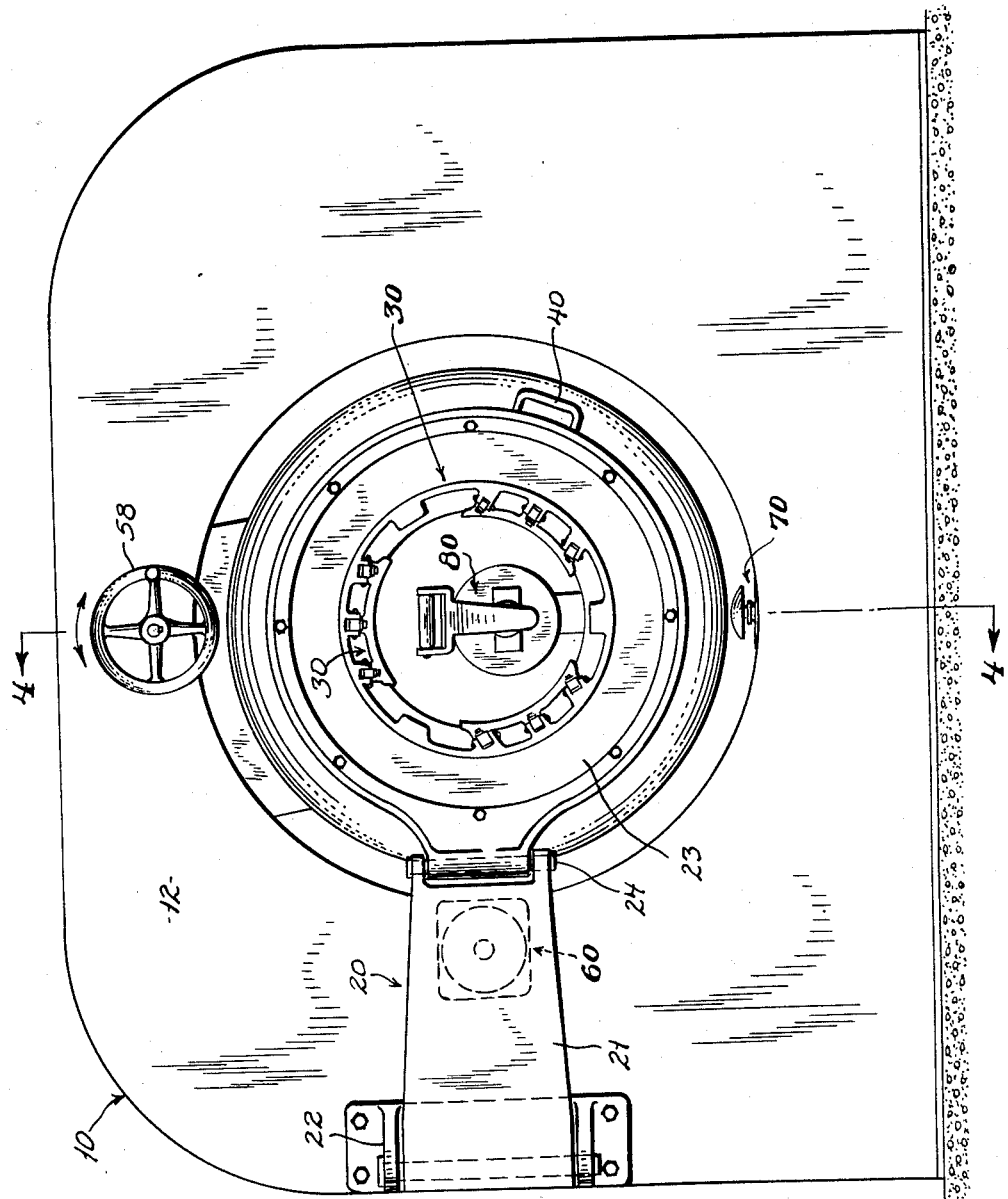

Aug. 1, 1950   E. C. KASTNER   2,517,438
MACHINE FOR EXTRACTING AIR BAGS
Filed March 15, 1946   5 Sheets-Sheet 2

INVENTOR.
EDWARD C. KASTNER.
BY Bates, Teare & McBean
Attorneys.

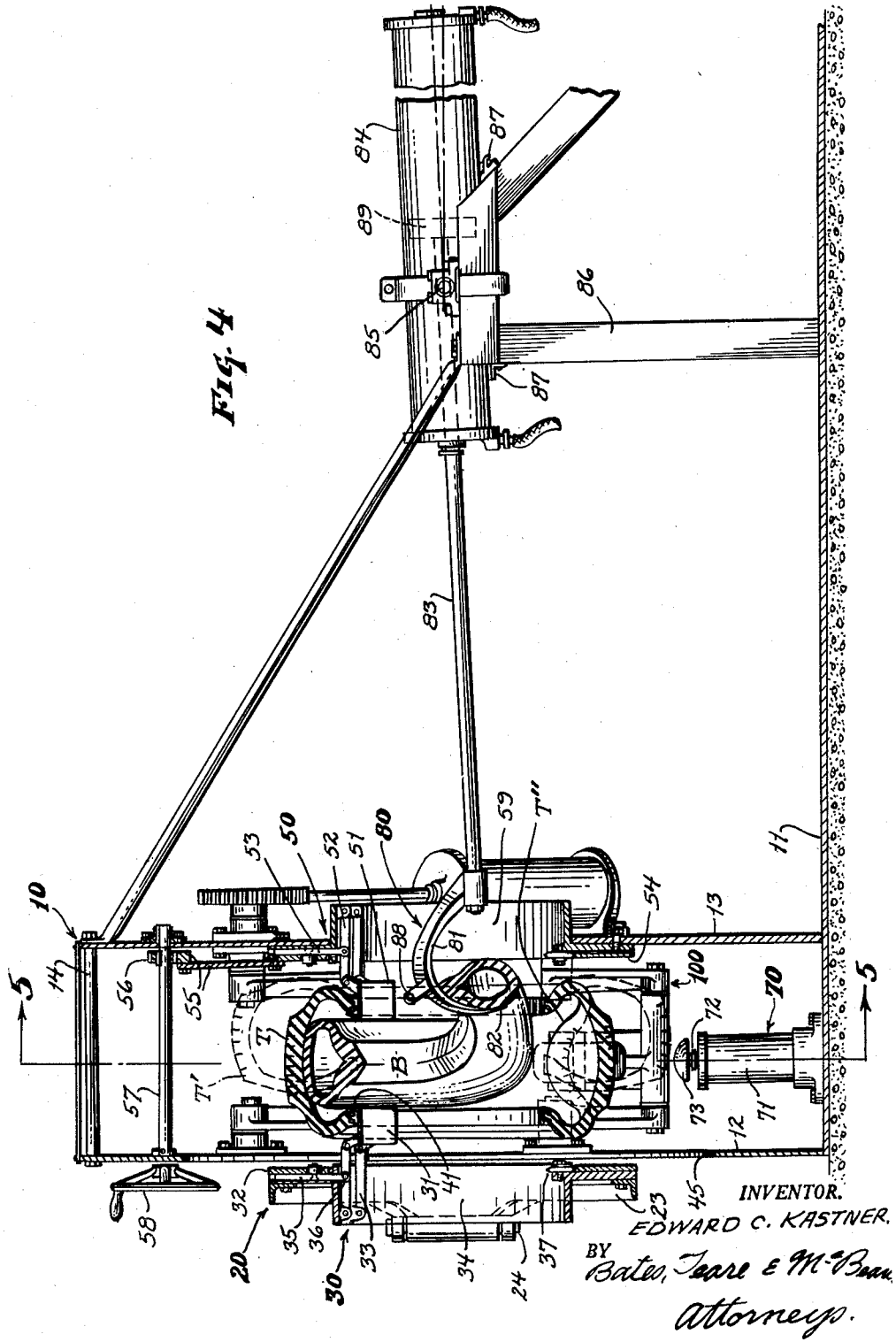
Aug. 1, 1950     E. C. KASTNER     2,517,438
MACHINE FOR EXTRACTING AIR BAGS
Filed March 15, 1946     5 Sheets-Sheet 3
INVENTOR.
EDWARD C. KASTNER.
BY Bates, Teare & McBean
Attorneys.

Aug. 1, 1950 E. C. KASTNER 2,517,438
MACHINE FOR EXTRACTING AIR BAGS
Filed March 15, 1946 5 Sheets-Sheet 4
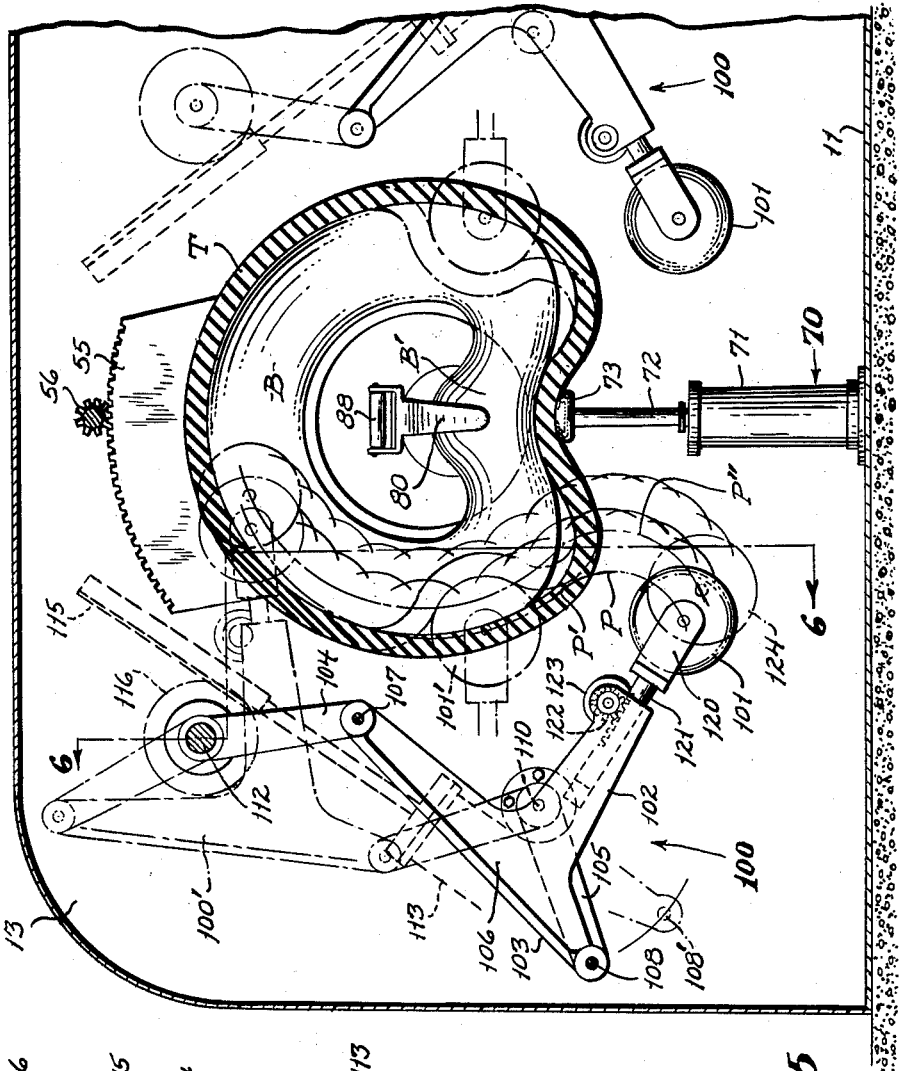
INVENTOR.
EDWARD C. KASTNER.
BY Bates, Teare & McBean
Attorneys.

Aug. 1, 1950 E. C. KASTNER 2,517,438
MACHINE FOR EXTRACTING AIR BAGS
Filed March 15, 1946 5 Sheets-Sheet 5

INVENTOR.
EDWARD C. KASTNER.
BY Bates, Teare & McBean.
Attorneys.

Patented Aug. 1, 1950

2,517,438

UNITED STATES PATENT OFFICE 2,517,438

MACHINE FOR EXTRACTING AIR BAGS

Edward C. Kastner, Akron, Ohio, assignor to The Akron Standard Mold Company, Akron, Ohio, a corporation of Ohio Application March 15, 1946, Serial No. 654,770

6 Claims. (Cl. 18—2)

This invention relates to a machine for removing the air bag from a newly vulcanized tire.

The air bag upon which this machine is to operate is the usual device in the nature of an inner tube which is inserted into a partially cured tire casing when the latter is put into a vulcanizing mold. The air bag is there inflated under pressure to force the casing outwardly against the mold members. When the tire is subsequently withdrawn from the mold, the air bag must be removed to enable the succeeding manufacturing operations on the tire.

One of the difficulties heretofore experienced in the extraction of air bags from tires has been in the prevention of damage to the tire, caused by the forcible dragging of the air bag over the bead rims. Heretofore the tire has been deformed at some one point to kink the air bag radially inwardly and the portion which thus extended into the open center of the tire was grasped by appropriate means and pulled axially of the tire. Two further kinks were thus produced in the air bag where it was forced to bend over the bead rim. Although made of rubber or rubber-like composition, the bag is exceedingly stiff and resistant when kinked and can easily cause a permanent distortion of the bead rim and in many cases, while being dragged from the tire, has actually pulled the plies away from the tire wall. The problem is especially serious in the case of truck tires where a large and bulky air bag must be withdrawn through an opening of small diameter.

An object of the present invention is to provide a machine for removing air bags from tires, especially truck tires, without deforming the bead portion or injuring the adjacent plies.

To accomplish this object, a support for the tire is furnished which grips the bead rims and pulls them axially apart, and means are provided to press radially inwardly on the tread of the tire to force a portion of the air bag through the gap between the beads to a position where it may be engaged by a power operated hook. Provision is made whereby the tread may thereafter be pressed inwardly, progressively around the tire, to free more and more of the bag from the confinement of the beads and allow it to be withdrawn axially by the hook until the entire bag is removed.

Another object of the invention is to provide a simple and rugged mechanical movement by means of which one member, such as the tread pressing member, may be moved in a substantially radial direction toward a circular member, such as a tire, and then in a substantially circular path peripherally of the circular member.

A further object is to provide means whereby the mechanical movement may be adapted to various sizes of circular members or tires.

Other objects and advantages of the present invention will be made apparent by the following specification and claims and the appended drawings.

Figure 2:
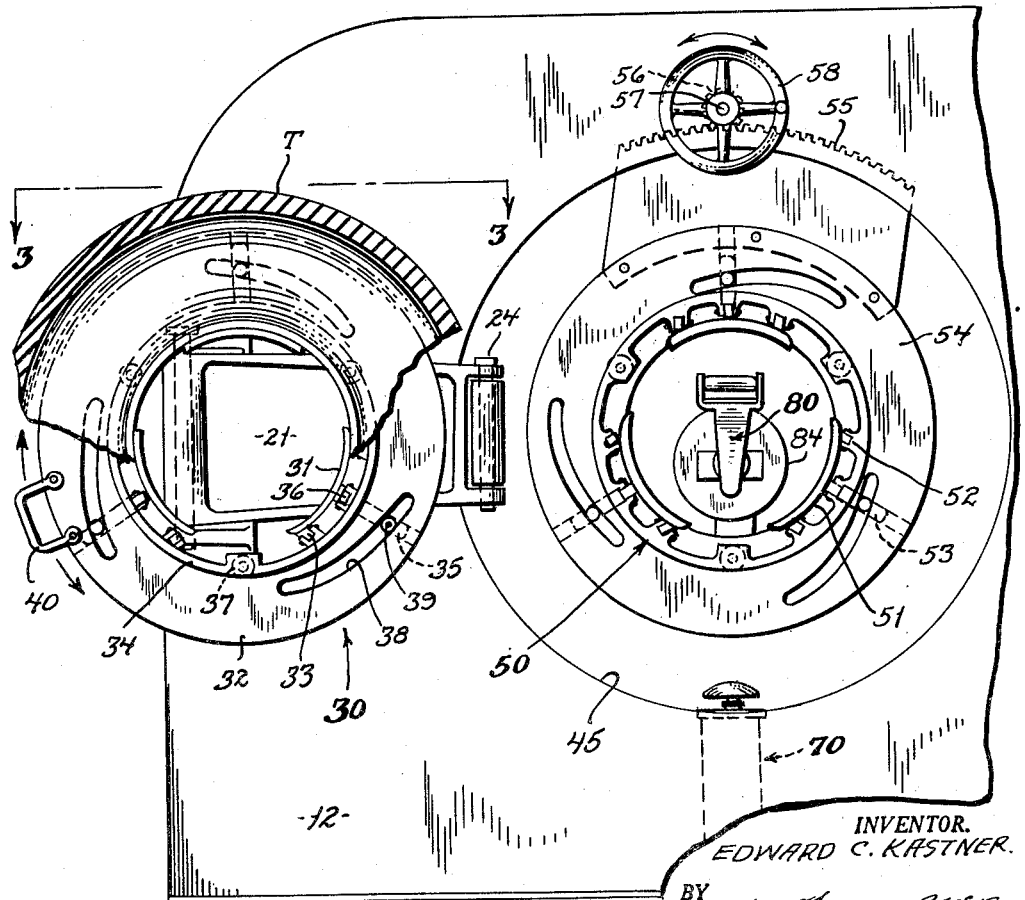
Figure 7:
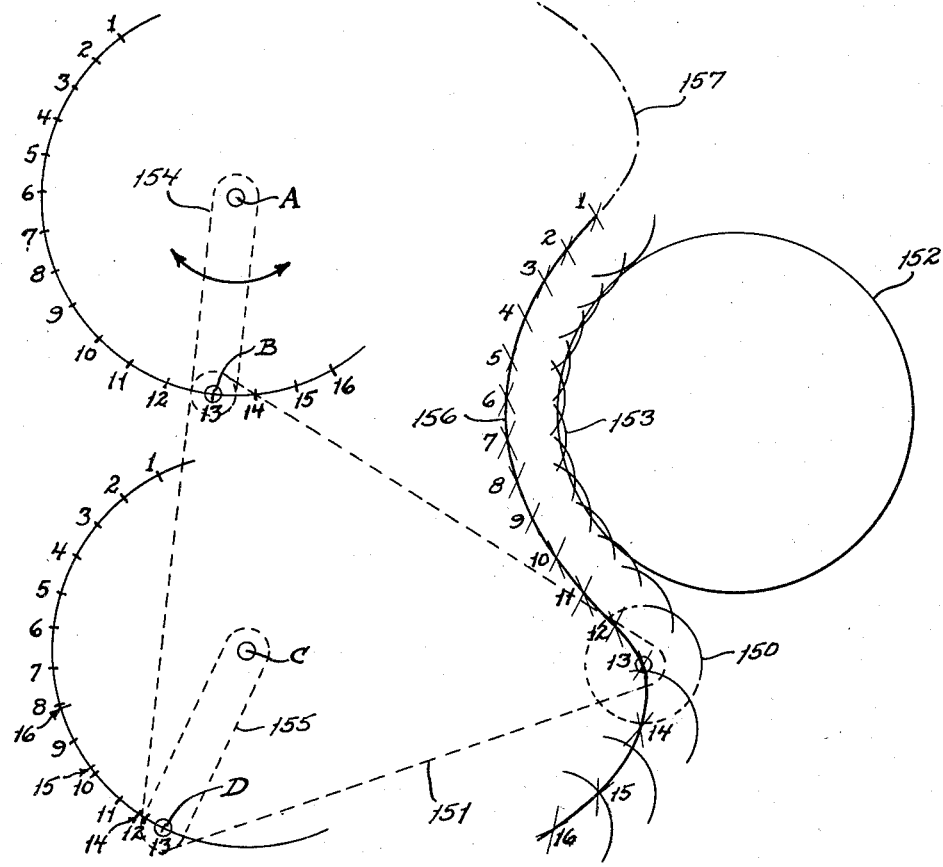

In the drawings, Fig. 1 is a front elevational view of a tire air bag removing machine embodying my invention; Fig. 2 is a view similar to Fig. 1 but showing a portion of the tire supporting mechanism swung to tire-receiving position; Fig. 3 is a horizontal section taken on the plane 3—3 of Fig. 2; Fig. 4 is a vertical section taken on the plane 4—4 of Fig. 1 and illustrating a tire in place and an air bag being removed therefrom; Fig. 5 is a vertical section taken on the plane 5—5 of Fig. 4; Fig. 6 is a vertical section taken on the offset plane 6—6 of Fig. 5 but showing the parts in different relative position; and Fig. 7 is a diagrammatic illustration of certain of the parts and their paths of movement.

In the drawings, and particularly in Figs. 1 to 6, I have illustrated a preferred form of my invention. A main frame, indicated generally at 10, carries a hinged support indicated at 20 upon which the tire T with its enclosed air bag is placed as it comes from the vulcanizer, as shown in Figs. 2 and 3. The support includes a chuck 30 which engages one of the bead rims of the tire. The tire is then manually swung into the machine, to the broken line position of Fig. 4, where it is engaged by a second chuck 50 which grips the other bead rim. A power device 60 then separates the two chucks to open the gap between the bead rims, stretching the tire to the form shown in full lines in Fig. 4. With the tire in this position a pressure device 70 then acts upon the tread of the tire to bow it radially inwardly to produce an inward bulge in the air bag B. A pneumatically operated hook 80 is then manually placed on the bulge and caused to draw the air bag from the tire. While the hook is pulling upon the air bag, a pair of power actuated linkages 100 force a pair of rollers against the tread to bow it inwardly and then move the rollers in arcuate paths about the tire to force the air bag progressively beyond the bead. The air bag is then drawn from the rear of the machine by the hook and the tire is removed from the machine by returning the rollers to idle position, then releasing the pressure device 60, then the rear chuck 50, and then, after the support 20 has been swung to its open position, releasing the chuck 30.

The main frame 10 comprises chiefly a base 11, a front wall 12, a rear wall 13, and tie members 14. The swinging tire support 20 comprises an arm 21, pivoted on a bracket 22 carried by the front wall 12, and an annular head 23 pivoted at 24 on the arm. In the open position, illustrated in Figs. 2 and 3, the head 23 is swung back against the arm and thus exposes its inner face. A stop member 25 (Fig. 3) is provided on the arm to prevent the head from swinging in a closing direction more than a predetermined amount relative to the arm and thus to transmit the force of the pressure device 60 to the head for the bead stretching operation.

Referring now to the front bead chuck 30, which is carried by the head 23 and by means of which the tire is supported thereon, it will be seen in Figs. 2 and 4 that I provide three jaws 31 which may radially grip the bead rim under the control of a manually operated cam plate 32. To preserve the proper engagement with the tire despite variations in the diameter of the rims, I prefer to mount the jaws for parallel motion as shown. Each jaw is carried by three parallel arms 33, pivoted at one end to a cylindrical flange 34 surrounding the central opening of the door, and pivoted at their other ends to the jaw. Each jaw is provided with a sliding bar 35, having a pivotal connection at 36 with one of the parallel bars 33 and reciprocable in a radial slot in the head. The annular cam plate 32 is rotatably mounted on the head by means of a series of rollers 37, and is formed with three spiral slots 38 for coaction with cam-following rollers 39 on each sliding bar 35. A handle 40 is secured to the cam plate whereby the operator may rotate the latter and thereby swing the jaws radially outwardly or inwardly to engage or disengage the tire. The individual jaws 31 are of the form of curved plates and are provided with outwardly hooked edges at 41 whereby they may engage the inside face of the bead rim for the stretching operation later to be described. One of the jaws is arranged at the top of the head and thus forms a convenient support for the tire when the latter is first placed on the machine in the position of Figs. 2 and 3, the tire being retained thereon by the hooked edge of the jaw while the operator manipulates the cam mechanism to engage the remaining jaws.

With the tire securely in place upon the head, the arm 21 and the head are swung upon their pivotal supports until the tire and head pass through an opening 45 in the front wall 12 and the tire engages the rear bead chuck 50. The rear chuck may be identical with the forward chuck just described and in this case comprises three hooked jaws 51 each of which is supported on a parallel motion linkage 52 operable, through sliding bars 53, by a rotatable annular cam plate 54. These jaws effectively mask the bead rim, as best seen in Fig. 4, against the abrading action of the air bag. Being of substantial circumferential extent, the lower two jaws 51, best seen in Fig. 2, protect the rim in the regions of greatest destructive action. For the convenience of the operator the control for the rear cam plate is brought to the front of the machine. This may conveniently be accomplished by means of a gear segment 55 carried by the cam plate and meshing with a pinion 56 on a shaft 57 provided with a hand wheel 58 within reach of the operator. By means of this cam control the rear jaws are swung radially inwardly, within the central opening 59 of the rear wall, to clear the tire bead rim and, after the tire is swung inwardly to the broken line position T', of Fig. 4, the jaws are swung outwardly to hookingly engage the bead rim.

To allow the air bag B to be removed radially inwardly from the confines of the tire, the gap between the two bead rims is enlarged by forcibly separating the front and rear chucks. This separation is conveniently effected by means of a hydraulic or pneumatic pressure device 60 mounted on the front wall 12 and provided with a plunger 61 adapted to press outwardly on the arm 21. The arm, by reason of the shoulder 25 previously mentioned, swings the head 23 outwardly until the tire is stretched to the position indicated in full lines at T in Fig. 4.

While the tire has this stretched configuration, it is less rigid in a radial direction than before. Advantage is taken of this fact by pressing inwardly on the tread portion to eject the air bag from behind the bead rims. Ejection of the air bag is initiated by localized pressure on the tire tread to cause a single inward bulge of the air bag. This localized pressure may conveniently be obtained by means of a hydraulic or pneumatic device 70 comprising a cylinder 71 mounted on the base of the machine and provided with a ram 72 having an enlarged head 73. At the proper time in the operation, the ram is caused to rise and lift the lowermost region of the tire to the dotted line position T'' of Fig. 4 and the full line position of Fig. 5. An inward bulge or bowed portion B' is thus produced in the air bag for engagement by the hook 80 about to be described. Engagement by the hook prevents the bowed-in portion from returning into the tire and so the latter is allowed to regain its normal position, shown in full lines in Fig. 4, by exhausting the pressure under the ram 72.

The hook 80, by means of which the air bag is withdrawn from the tire, comprises a curved arm 81 having a slightly rearwardly directed free end 82 for positive engagement with the air bag. The hook is rigidly carried by an elongated piston rod 83 extending forwardly from an air cylinder 84. The cylinder is mounted, by means of trunnions 85, on a framework 86 secured to the base 11. The rocking motion of the cylinder on its trunnions may be limited by stops 87 to thereby maintain the hook in the operating region. The hook is provided with a handle 88 for manual placement in proper engagement with the air bag.

The piston rod 83 is freely rotatable upon its axis and, when air pressure is not applied to the cylinder, is freely slidable in and out of the latter. Thus the operator may reach through the central opening in the door to grasp the handle and lift the hook upwardly and forwardly over the air bag and then downwardly into hooking engagement therewith. By operating an appropriate valve, not shown, air pressure may then be applied at the forward end of the cylinder to move the piston 89 rearwardly and to place tension upon the air bag. The hook, therefore, withdraws the air bag from the tire as it is progressively released from the latter by means about to be described.

To eject the still confined remainder of the air bag from the tire, I provide means whereby a pair of rollers 101 may be brought into forcible pressing engagement with the tread of the tire, adjacent the initially contacted region, to increase the extent of the bowed-in portion B' of the air bag, and whereby the rollers may then be forced in a substantially arcuate path up and around the respective sides of the tire to progressively eject the air bag therefrom. The hook 80, meanwhile, continues to draw the air bag through the central opening 59 of the rear wall 13 and, as the rollers approach the upper region of the tire, the air bag is sufficiently released for complete withdrawal. The air bag is then discharged at the rear of the machine and air pressure may be applied to the rear end of the air cylinder 84, by means of an appropriate valve not shown, to move the hook forwardly to an idle position ready for the next operation.

The means for operating the rollers 101, as just described, comprise a pair of power actuated linkages 100. The linkages may be similar in all respects and so one, only, will be described. The roller 101 is carried by the projecting leg 102 of a T-shaped carrier 103. To support the carrier and to cause its roller to describe the desired path, I have devised a mechanical movement comprising a pair of rocking yokes 104 and 105 to which the respective ends of the carrier cross bar 106 are pivotally secured, as at 107 and 108. As best seen in Fig. 6, the lower yoke 105 comprises a pair of rocker arms 109 freely rotatable on concentric trunnions 110 respectively carried by the front and rear walls of the frame.

The upper yoke 104 constitutes the driving member of the linkage and comprises a pair of arms 111 drivingly keyed to a shaft 112 carried in appropriate bearings in the side walls. The shaft is forcibly oscillated, through a gear and rack couple, by an appropriate power device such as a hydraulic or pneumatic cylinder, illustrated at 113, rigidly mounted on the rear wall of the machine. The piston rod 114 of the cylinder is adapted to reciprocate a rack 115 meshing with a gear 116 drivingly secured to the shaft 112. The rack is maintained in driving engagement with the gear by any suitable guiding means, not shown.

By a proper choice for the various lengths and distances of the linkage members and their pivots, the roller 101 may be caused to describe the desired path as the upper yoke 104 is rocked by the power drive. Referring to the broken line position 100' of the linkage in Fig. 5, it will be noted that if the distance between the pivots 107 and 108 were equal to that between the trunnions 110 and the shaft 112, and if the yokes 104 and 105 were of equal length, a true parallel motion would be obtained and every point on the carrier 103, including the center of the roller 101, would describe a circular arc identical with that of the connection 107. The roller could thereby be caused to press inwardly against a tire while traveling in a path concentric with the tire axis, but other means would have to be incorporated to cause the roller to forcibly approach the tire in the first place and to withdraw it when the tire was to be removed. This inability, of a true parallelogram, to operate in the desired manner is due to the instability at the dead-center position. Outside means would be required to urge the lower yoke to the right or left as the upper yoke continued to the right, for example, and in the absence of such outside means the lower yoke would lock.

The appropriate path of movement of the roller, including its feeding and withdrawal, may be obtained by varying the configuration of the linkage members slightly from that of a parallelogram. This may be done by providing a shorter yoke at 104 than at 105, by decreasing the spacing of the pivots 107 and 108 below that of the trunnion and shaft, or by a combination of these two variations. Thus, the essential feature is that the sum of the pivot spacing on one yoke or arm and the pivot spacing on the frame is to be greater than the sum of the spacing on the other yoke or arm and the spacing on the carrier. This feature I have illustrated for a generalized case in the diagram of Fig. 7 where an operating member 150 is carried by a carrier 151 and is caused to operate on a circular article 152 along a path 153. The carrier is supported and moved by arms 154 and 155, the arm 154 being pivoted to a base at A and to the carrier at B while the arm 155 is povted to the base at C and to the carrier at D. As the arm 154 is swung in a clockwise direction from the position shown, the arm 155 follows it in a generally parallel manner. The movement of the carrier is thus substantially one of translation and the center of the operating member 150 describes a substantially arcuate path 156.

As the arm 154 is swung counterclockwise from the position shown, however, the arm 155 moves as before, that is, in a clockwise direction. This retracing of its path is due to the fact that the distance $$\overline{AB}+\overline{BD}$$

is less than the distance $$\overline{AC}+\overline{CD}$$

The movement of the carrier at this time is predominantly one of rotation and the path 156 thus veers away from the circular article in an abrupt manner.

The portion 157 of the path 156 is not realized in practice, where only the arm 154 is power driven, as the pivot D cannot go beyond the point t, but such portion is here illustrated to make apparent the nature of the generated curve.

Having thus described the basis of the design, and returning to the present embodiment, it will be seen that my preferred form is that shown in the drawings wherein the yokes 104 and 105 are of equal length and the spacing 107—108 is smaller than the spacing 110—112. The difference of the two spacings is small enough to cause the path P of the roller center to depart only slightly from the circular as the linkage moves downwardly from the broken line position 100' to a position such that the roller is at a point P' in its path. Shortly thereafter the pivot 108 reaches a point 108' in its circular path beyond which it cannot go because of the diminished spacing 107—108. As the yoke 104 then continues, past dead center alignment with the point 108' and the shaft 112, the pivot 107 continues downwardly and to the right, as viewed in Fig. 5, while the pivot 108 is pulled upwardly and to the left. The result is a clockwise tipping of the carrier 103 and the roller 101 is withdrawn from the tire to its idle position, shown in full line.

It has been convenient to describe the path of the roller as it descends from its upper limit, but it will be understood that exactly the same path is traversed in the opposite direction during the working part of the cycle. Thus, after the hook 80 has been engaged with the partially bowed-in air bag, an appropriate valve is actuated to energize the power device 113 and the driving yoke 104 is moved thereby, in a clockwise direction from the full line position, to cause the roller to press into the tire tread and bulge it inwardly to eject more of the air bag. The roller then moves upwardly at approximately the same distance from the center of the tire, with the bulge in the tread progressing with it, as illustrated at 101'. The two rollers 101 move symmetrically at opposite sides of the tire and, as previously mentioned, when they arrive at the upper limit of their strokes the air bag is completely released from the tire and withdrawn by the hook.

Settable means are provided whereby the machine may be conditioned to accommodate different sizes of tires. As best seen in Fig. 5, the roller 101 is mounted in a yoke 120 carried by a stem 121. The stem is slidable in a bore in the leg 102 of the carrier and may be adjustably extended therefrom, as shown, by means of a rack integral with the stem, and a pinion 122 rotatably carried by the leg and provided with a hand wheel 123. Either the pinion or rack may be locked in adjusted position by any suitable means not shown. When the roller is extended to the dotted line position, indicated at 124 in Fig. 5, the path P'', travelled by the roller axis, is similar in form to the former path P but lies nearer the axis of the tire. Thus, for any given size of tire a position of the roller, relative to the carrier, may be selected which will produce the desired degree of deformation of the tire tread for the proper ejection of the air bag.

Referring now to the removal of the tire from the machine, it will be seen that the various steps performed during its engagement are to be performed in reverse order, that is, the pressure device 60 is deenergized, allowing the door 23 to swing inwardly and the tire to regain its unstressed position at T' of Fig. 4. The hand wheel 58 is then operated to release the rear bead chuck and the door is swung open to the position of Fig. 2. By means of the handle 40 the front bead chuck may then be released and the tire lifted from its support on the upper chuck jaw.

While I have described a specific embodiment it will be apparent that numerous changes and modifications may be made within the spirit and scope of my invention. It will be apparent, for example, that the mechanical movement which I have described need not be limited to use in connection with the ejection of an air bag from a tire, but could be used to move a buffing wheel over a selected area of a tire tread. In such a case the departure from the purely circular has a distinct advantage in that the thickness of material removed would gradually taper off at each end of the area and no undesirably sudden change of contour of the tire would result.

It will also be apparent that numerous changes and modifications of the other mechanical features of the machine may be made within the purview of my invention.

I claim:

1. In a machine for removing an air bag from a tire having bead rims and a tread, a frame, an axially fixed bead chuck on the frame, a swinging member pivoted on the frame, a second bead chuck carried by the swinging member and adapted to support a tire, the swinging member being adapted to move the tire into engagement with the first-named chuck, power means adapted to swing the member away from the first-named chuck to thereby separate the bead rims and reduce the radial rigidity of the tire tread region, pressure means to bulge inwardly successive regions of the tread to eject successive portions of the air bag, and means to engage the air bag and withdraw it axially during the operation of the said pressure means.

2. In a machine for removing an air bag from a tire having bead rims and a tread; a frame; a bead chuck carried by the frame; an arm pivoted at one end on the frame; a second bead chuck pivoted at the other end of the arm and adapted to support a tire; means to limit the pivoting of the second-named chuck on the arm, the arm and second chuck being adapted to carry a supported tire into engagement with the first-named chuck; power means adapted to swing the arm and, through the said pivot limiting means, to swing the first chuck from the second chuck to thereby separate the bead rims and reduce the radial rigidity of the tread; pressure means to bulge inwardly successive regions of the tread to eject successive portions of the air bag; and means adapted to engage the air bag and withdraw it axially from the tire.

3. In a machine for removing an air bag from a tire having bead rims and a tread; a frame; a bead chuck on the frame, said chuck comprising a plurality of hooked jaws adapted to hookingly engage one of the bead rims; a plurality of members radially slidable on the frame and each operatively connected to one of the jaws and carrying a cam follower; a selectively rotatable member provided with a plurality of cammed surfaces for coaction with the cam followers; a second chuck adapted to engage the other bead rim of a tire; means for separating the chucks to thereby spread the bead rims and reduce the radial rigidity of the tread; pressure means adapted to bulge inwardly a portion of the tread to bow in a portion of the air bag; and means to engage the bowed-in portion and withdraw the air bag from between the separated rims and from the tire.

4. In a machine for removing an air bag from a tire having bead rims and a tread, a frame, means on the frame to separate the bead rims, a roller, a linkage to move the roller into pressing engagement with the tread and to roll it arcuately about the tire to eject radially inwardly successive portions of the air bag, said linkage comprising a carrier for the roller, a driving rocker arm pivoted at one point on the frame and at a second point on the carrier, a driven rocker arm pivoted at one point on the frame and at a second point on the carrier, the summation of (1) the distance between the two pivot points of the driving rocker arm and (2) the distance between the pivot point of the driving rocker arm on the carrier, and the pivot point of the driven rocker arm on the carrier, being less than the summation of (1) the distance between the pivot point of the driving rocker arm on the frame, and the pivot point of the driven rocker arm on the frame and (2) the distance between the two pivot points on the driven rocker arm.

5. In a machine for removing an air bag from a tire having bead rims and a tread, a frame, means on the frame to separate the bead rims, a roller, a linkage to move the roller into pressing engagement with the tread and to roll it arcuately about the tire to eject radially inwardly successive portions of the air bag, said linkage comprising a carrier for the roller, a driving rocker arm pivoted at one point on the frame and at a second point on the carrier, a driven rocker arm pivoted at one point on the frame and at a second point on the carrier, the summation of (1) the distance between the two pivot points of the driving rocker arm and (2) the distance between the pivot point of the driving rocker arm on the carrier, and the pivot point of the driven rocker arm on the carrier, being less than the summation of (1) the distance between the pivot point of the driving rocker arm on the frame, and the pivot point of the driven rocker arm on the frame, and (2) the distance between the two pivot points on the driven rocker arm, and means for adjusting the distance of the roller from the line of the two pivot points on the carrier.

6. In a machine for removing an air bag from a tire having bead rims and a tread, a frame, means on the frame to separate the bead rims, a roller, a linkage to move the roller into pressing engagement with the tread and to roll it arcuately about the tire to eject radially inwardly successive portions of the air bag, said linkage comprising a carrier for the roller, a driving rocker arm pivoted at one point on the frame and at a second point on the carrier, a driven rocker arm pivoted at one point on the frame and at a second point on the carrier, the summation of (1) the distance between the two pivot points of the driving rocker arm and (2) the distance between the pivot point of the driving rocker arm on the carrier, and the pivot point of the driven rocker arm on the carrier, being less than the summation of (1) the distance between the pivot point of the driving rocker arm on the frame, and the pivot point of the driven rocker arm on the frame, and (2) the distance between the two pivot points on the driven rocker arm, means for adjusting the distance of the roller from the line of the two pivot points on the carrier, and means to engage the bowed-in portion of the air bag and to axially withdraw the air bag while the linkage is operating.

EDWARD C. KASTNER.

REFERENCES CITED

The following references are of record in the file of this patent:

UNITED STATES PATENTS

| Number | Name | Date |
| --- | --- | --- |
| 1,683,736 | Snyder | Sept. 11, 1928 |
| 1,738,504 | Stevens | Dec. 3, 1929 |
| 1,853,146 | Prentice et al. | Apr. 12, 1932 |
| 2,241,807 | Cotner | May 13, 1941 |
| 2,244,162 | Leguillon | June 3, 1941 |
| 2,341,741 | Putnam | Feb. 15, 1944 |
| 2,477,301 | Kastner | July 26, 1949 |

FOREIGN PATENTS

| Number | Country | Date |
| --- | --- | --- |
| 566,021 | Germany | Nov. 24, 1932 |